United States Patent
Nickles et al.

(10) Patent No.: US 6,219,595 B1
(45) Date of Patent: Apr. 17, 2001

(54) METHOD OF MINIMIZING UNDESIRABLE BRAKE RELEASE

(75) Inventors: Stephen K. Nickles, Burleson, TX (US); Michael J. Hawthorne, Watertown, NY (US); C. Mackay Foster, Burleson, TX (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/152,244

(22) Filed: Sep. 11, 1998

Related U.S. Application Data (63) Continuation-in-part of application No. 09/151,286, filed on Sep. 12, 1997, now Pat. No. 6,144,901.
(60) Provisional application No. 60/058,970, filed on Sep. 12, 1997, and provisional application No. 60/058,977, filed on Sep. 12, 1997.

(51) Int. Cl.[7] .................................................. G06F 17/00
(52) U.S. Cl. .................. 701/19; 246/182 B; 246/167 R; 303/122.15; 701/76
(58) Field of Search .............................. 701/19, 20, 70, 701/76, 78; 303/3, 15, 16, 20, 33, 122.15; 246/167 R, 182 B, 169 R, 182 R, 122 R (56) References Cited

U.S. PATENT DOCUMENTS

| | | |
|---|---|---|
| 4,013,323 | 3/1977 | Burkett ................................... 303/20 |
| 4,041,283 | 8/1977 | Mosier ................................... 701/20 |
| 4,042,810 | 8/1977 | Mosier ................................... 701/19 |
| 4,561,057 | 12/1985 | Haley, Jr. et al. .................... 701/117 |
| 4,794,548 | 12/1988 | Lynch et al. .......................... 702/188 |
| 4,827,438 | 5/1989 | Nickles et al. ............................ 703/8 |
| 4,853,883 | 8/1989 | Nickles et al. ............................ 703/8 |
| 5,369,587 | * 11/1994 | Root et al. .............................. 701/70 |
| 5,564,794 | 10/1996 | Hart ........................................ 303/3 |
| 5,638,276 | 6/1997 | Hart ....................................... 701/70 |
| 5,924,774 | * 6/1999 | Cook et al. ............................... 303/3 |
| 6,024,419 | * 2/2000 | Waldrop et al. .......................... 303/3 |

\* cited by examiner

*Primary Examiner*—William A. Cuchlinski, Jr.
*Assistant Examiner*—Edward Pipala
(74) *Attorney, Agent, or Firm*—Barnes & Thornburg (57) ABSTRACT

A method of and a system for minimizing undesirable brake release in the brake system of a train having a pneumatic brake on each car connected to a brake pipe which is controlled by a brake pipe controller. The method includes determining the status of the brake system throughout the train and determining a minimal brake pipe reduction for the brake pipe controller, using the status of the brake system. The determined minimal brake pipe reduction is displayed by itself or in combination with the brake pipe reduction produced by the brake pipe controller.

32 Claims, 5 Drawing Sheets

METHOD OF MINIMIZING UNDESIRABLE BRAKE RELEASE

CROSS REFERENCE

This application is a continuation-in-part of U.S. patent application Ser. No. 09/151,286 filed Sep. 11, 1998 and issued as U.S. Pat. No. 6,144,901; which is based on U.S. Provisional Application No. 60/058,970 filed Sep. 12, 1997. This application claims benefit of provisional applications Nos. 60/058,970 and 60/058,977 both filed Sep. 12, 1997 with respect to common subject matter and such applications are incorporated herein by reference.

BACKGROUND AND SUMMARY OF THE INVENTION

The present invention relates generally to locomotive display and more specifically to a method of minimizing undesirable brake release and its use with, for example, a Locomotive Engineers Assist Display and Event Recorder (LEADER).

The LEADER System is a real-time, enhanced version of the Train Dynamics Analyzer (TDA), a long standing Locomotive Engineer training tool offered by the Train Dynamics Services Group of New York Air Brake. LEADER has the ability to display a real-time or "live" representation of a train on the current track, the trackage ahead, the dynamic interaction of the cars and locomotives (both head end and remote), and the current state of the pneumatic brake system. As a tool for the Locomotive Engineer, LEADER will allow insight into the effect of throttle changes and brake applications throughout the train providing feedback and information to the Locomotive Engineer not currently available. The information LEADER offers provides an opportunity for both safer and more efficient train handling leading to enormous potential economic benefits.

The LEADER System has all the necessary information to predict the future state of the train given a range of future command changes (what if scenarios). With this ability, LEADER can assist the railroads in identifying and implementing a desired operating goal; minimize time to destination, maximize fuel efficiency, minimize in train forces, (etc.) or a weighted combination thereof. LEADER will perform calculations based on the operational goal and the current state of the train to make recommendations to the Locomotive Crew on what operating changes will best achieve these goals.

The TDA functionality was enhanced to assist in training Locomotive Engineer how to better handle their trains. Designs of simulators with math models are shown in U.S. Pat. Nos. 4,041,283; 4,827,438 and 4,853,883. Further capability was added to investigate accidents by playing the event recorder data through the TDA, monitoring critical physical parameters. Through the years data was collected from instrumented trains and laboratory experiments, allowing the models used by the TDA to be refined. On board data collection for off-loading is shown in U.S. Pat. Nos. 4,561, 057 and 4,794,548.

As the TDA became a training tool, more miles of track were added to the database each year as customers required training in various areas of their property. Over 120,000 miles of track have been digitized for use with the TDA. This track provides a basis for the track database required by LEADER.

As more Locomotive Engineers became familiar with the TDA display through training sessions, it became apparent that a real time version of the TDA in the cab of a locomotive would offer substantial benefits in improved train handling. Improved train handling would in turn foster safety and economic benefits. Technological limitations prevented the realization of LEADER for a number of years, but modern levels of computer processing power, decreased size of electronics, increase communication capability and increase size and readability of flat panel color displays has made LEADER a reality. Earlier designs for on board computer controllers is shown in U.S. Pat. No. 4,042,810 with a description of math models.

The LEADER system provides safe and effective control of a train through display or control of the dynamically changing parameters. It accurately provides train speed within designated speed limits. It maintains in-train coupling forces with safe limits to prevent train break-in-twos. It maintains safe levels of lateral forces between the wheels and the rails of all cars to prevent cars from departing from the track and derailing. It provides control of slack (or shock (buff)) action or shock for both draft and between cars to reduce damage to valuable lading and to prevent potential train separation or break-in-twos. It maintains train stop and slow downs to prevent the train from entering unauthorized territories that could cause accidents with other train traffic. It determines the optimum locomotive throttle setting and train brake application to minimize fuel consumption and wear of brake shoes and wheels. It monitors total locomotive performance, train brake performance and it provides advisement if performance is faulty. It forecasts the estimate time of arrival of train to various switch points, signals locations or final destinations to advise the engineer and rail traffic control centers. It records various key data for later downloaded analysis for operational studies and accident investigations as well as engineer qualifications.

The present invention provides a method of and a system for minimizing undesirable brake release in the brake system of a train having a pneumatic brake on each car connected to a brake pipe which is controlled by a brake pipe controller. The method includes determining the status of the brake system throughout the train and determining a minimal brake pipe pressure reduction for the brake pipe controller, using the status of the brake system. The determined minimal brake pipe pressure reduction is displayed by itself or in combination with the brake pipe pressure reduction produced by the brake pipe controller. The status of the brake pipe system includes determining the brake pipe pressure at each car which may be by actual measurement or using train brake system modeling. The status of each car may also include determining the minimal brake pipe pressure as a function of the pressure of the reservoir of each car by itself or in combination with the brake cylinder pressure. The minimal brake pipe pressure for each car may be set at 3 PSI less than the pressure of the reservoir of each car. Another method would include setting the minimal brake pipe pressure to the reservoir pressure for a brake cylinder pressure greater than a first value and setting the minimal brake pipe pressure to a pressure less than the reservoir pressure for a brake cylinder pressure less than the first value.

The brake pipe controller setting or desired brake pipe pressure reduction is also determined and the minimal brake pipe pressure reduction can be determined using the brake pipe controller setting. The requested brake pipe pressure reduction is compared to the determined minimal brake pipe pressure reduction. An indication is provided if the requested brake pipe pressure reduction is less than the determined minimal brake pipe pressure reduction. The determined minimal brake pipe pressure reduction can be displayed if the requested brake pipe pressure reduction is less than the determined minimal brake pipe pressure reduction and the requested brake pipe pressure reduction can be displayed if the requested brake pipe pressure reduction is greater than the determined minimal brake pipe pressure reduction.

If the requested brake pipe pressure reduction is less than the minimal brake pipe pressure reduction, the brake pipe controller is controlled to the minimal brake pipe pressure reduction. If the requested brake pipe pressure reduction is greater than the minimal brake pipe pressure reduction, the brake pipe controller is controlled to the requested brake pipe pressure reduction.

The train may include a plurality of brake pipe controllers. In which case, the status of the pneumatic brake system at each brake pipe controller is determined and the minimal brake pipe pressure reduction is determined for each brake pipe controller.

The locomotive display system for the train would include a display of the brake pipe pressure reduction at the locomotive and a display of a minimum brake pipe pressure reduction which minimizes undesirable release in the brake system. The brake pipe pressure reduction may be an analog display and the minimum brake pipe pressure reduction is an indicia on the analog display. A digital display may also be provided for the brake pipe reduction by itself or in combination with the analog display. A processor is provided which determines the minimal brake pipe pressure reduction as a function of the brake system status and determines the minimal brake pipe pressure reduction which minimizes the potential for brake pipe release for each car. It also determines the minimal brake pipe pressure reduction for the brake controller using the lowest minimal brake pipe pressure determined.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
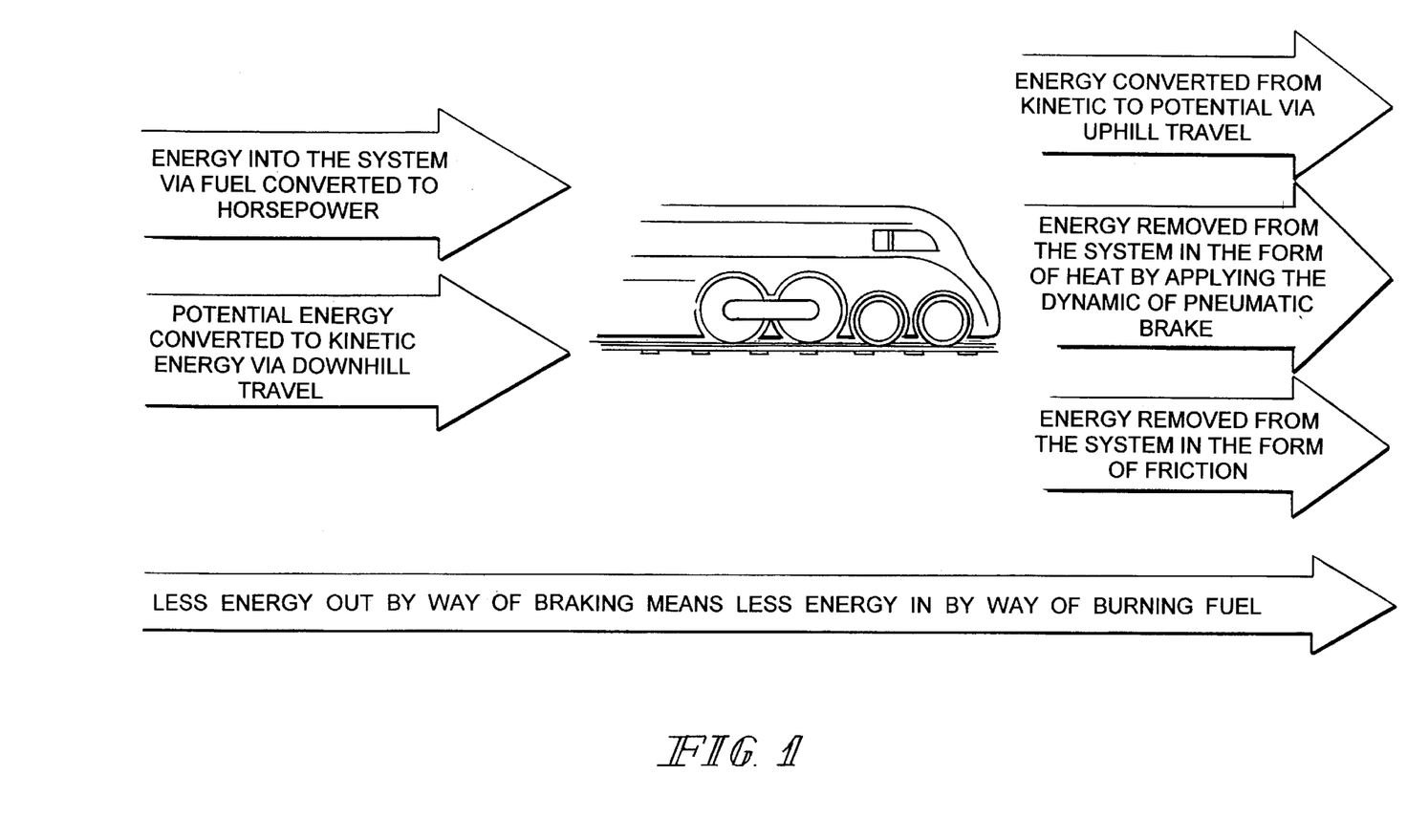
FIG. 1 is a diagrammatic view of the energy balance system according to the principles of the present invention.

LEADER operates on the principle of conservation of energy, kinetic and potential as illustrated in FIG. 1. Some events increase the amount of kinetic or potential energy in the system, while others reduce it. Burning fuel converts matter to energy (motion via horsepower and heat), while braking converts kinetic energy into heat, slowing the train. Energy changes state but, the total sum of energy in the system must be a constant. A train in motion is constantly converting fuel to energy, converting kinetic energy into potential energy traveling uphill against gravity, converting potential energy into kinetic energy traveling downhill, and removing kinetic energy in the form of heat from the friction and dynamic brake systems.

Math models of the LEADER System, monitors parameters and performs calculations based on the current energy state of the train to create a real-time display of train dynamics. The power of LEADER resides in its ability to provide information allowing the crew to better control the train, minimizing loss of energy. Loss of energy via overbraking represents fuel unnecessarily consumed. Energy imparted to the cargo of the train represents potential damage to lading, equipment and rail. Both phenomena are undesirable and addressable with LEADER.

Figure 2:
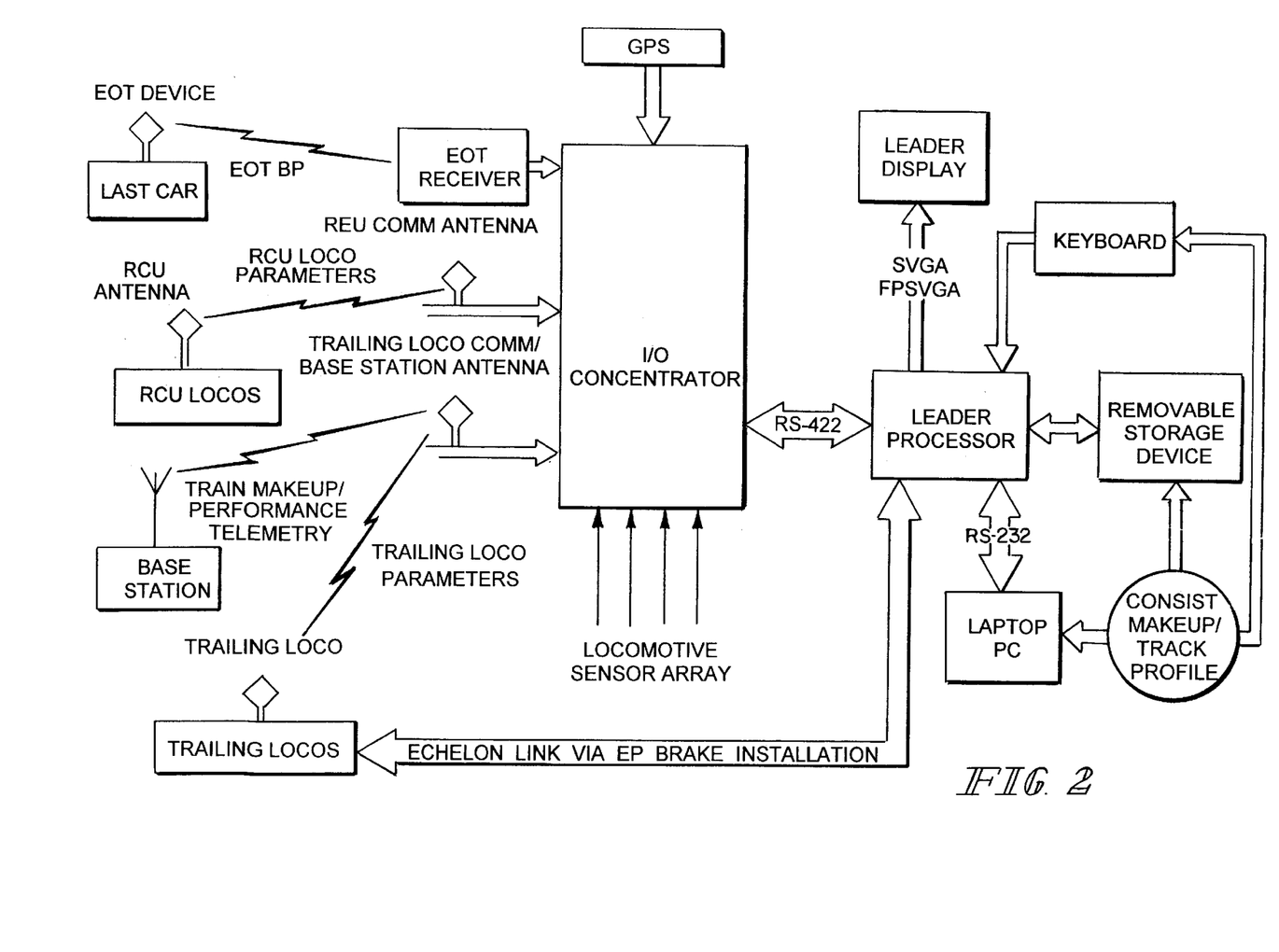
FIG. 2 is a block diagram of the system components of a locomotive assist display and event recorder according to the principles of the present invention.
Figure 5:
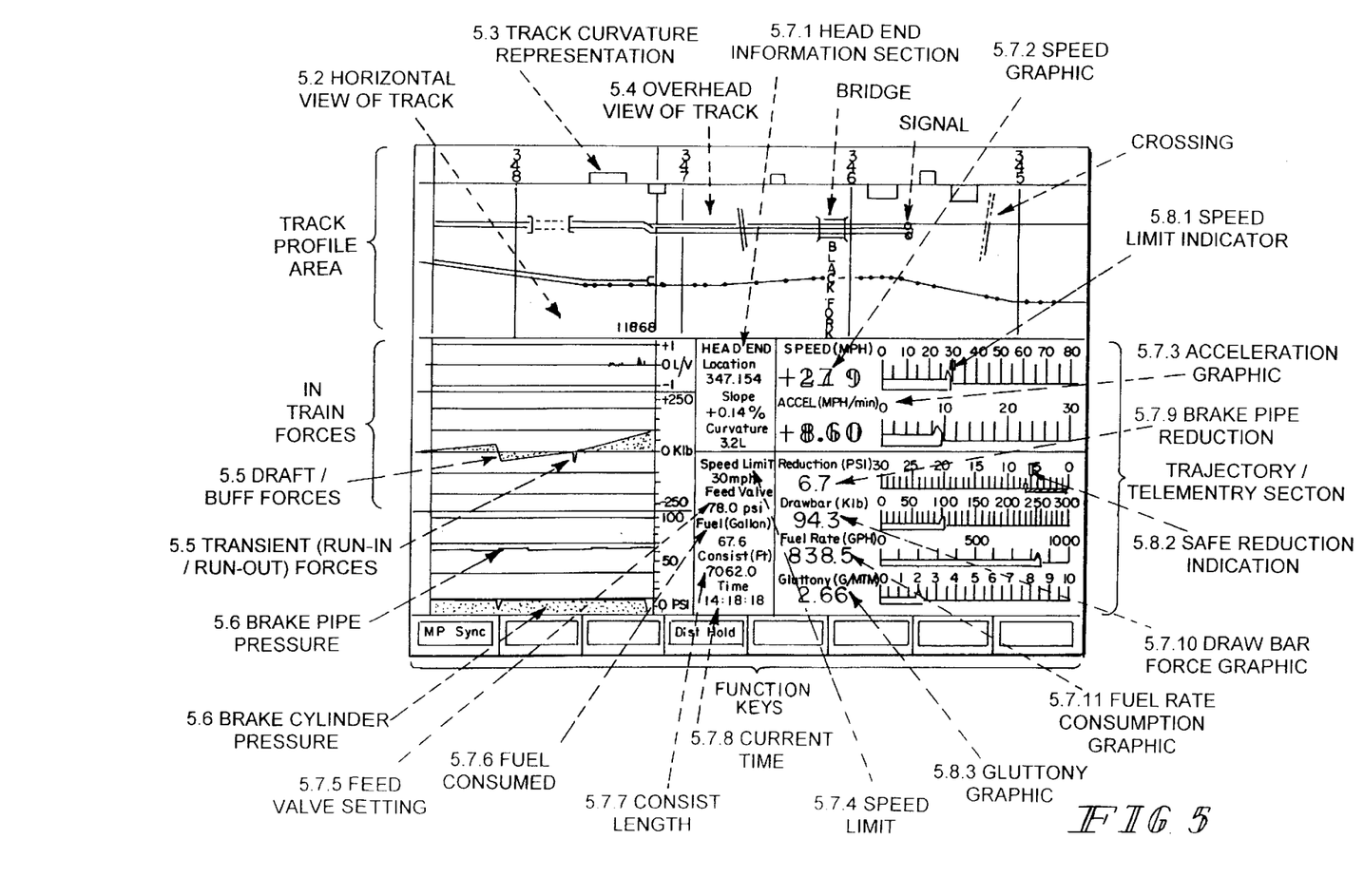
FIG. 5 is a LEADER display incorporating the principles of the present invention.

The LEADER system is comprised of a number of subsystems each with specific duties. FIG. 2 shows a generic LEADER architecture. The user interface of the LEADER System is the real-time display which shows a graphical and numerical representation of the current state of the train as shown in FIG. 5. Radio communication is established between the lead locomotive, the trailing locomotives in the lead consist, and locomotives in the remote consist to report the necessary parameters from each of these locomotives necessary to perform LEADER Calculations. Consist information is entered via the key pad on the real-time display, a wired communication source (laptop PC or removable storage device) or via wayside radio communication. Position is determined from wheel movement sensors and a Global Positioning System (GPS). The Input/Output (I/O) Concentrator gathers all of the various locomotive parameters necessary for LEADER algorithm calculations and reports the information to the LEADER Computer. The LEADER Processor, a high throughput capacity computer platform using a Real Time Operating System (RTOS), then performs the calculations required by the LEADER algorithms and the real-time display is updated. All of these sub-systems combine to form the LEADER System.

Each locomotive in a LEADER train will require at a minimum, the I/O Concentrator with communication capability to the head end. A LEADER Processor and Display are only required for the lead locomotive. The decision to equip all locomotives with a full LEADER installation (Processor, Display in addition to the I/O Concentrator) should be based on the Railroads ability to permanently designate a locomotive as lead or trail in its duties.

The development of LEADER began over 20 years ago with early efforts to create the Train Dynamics Analyzer (TDA), a computer math model used to predict in-train forces. The train dynamic modeling techniques and algorithms embodied in the TDA are described in U.S. Pat. No. 4,041,283.

LEADER provides a number of unique features that are available due to LEADER's comprehensive knowledge of the state of the train. Many of these features allow the Railroad to convey and enforce operating policies by programming limits into the LEADER System such that when the limits are exceeded, LEADER will audibly and/or visibly alert the crew to the situation.

FIG. 5 shows a "frozen" LEADER Display. Each LEADER feature is identified by a block which points to the appropriate screen location. The sections following use the same paragraph number as the identification block detail the operation of each feature.

The LEADER Display shown in FIG. 5 represents one particular configuration for the display of LEADER information. The display format can be customized on customer request by adding information, removing information, changing the color scheme, rearranging the position of the sections of information, and/or varying the size of any particular graphic.

In the following descriptions of features on the LEADER Display the term function will be used to describe the plot of the magnitude of a particular parameter across the length of the train varying with time.

5.1 Track Profile

The top portion of the LEADER Display shows the track profile in three views. The train consist is represented with different colored blocks for the locomotive units and for the cars. The length of the displayed train is proportional to the length of the actual train. Milepost marks are represented by lines running vertically through the track profile portion of the display.

5.2 Horizontal View of Track

The horizontal view of the track profile shows the grade on which the train is currently positioned and the grade of the track profile for a number of miles ahead. The Horizontal View of the track profile will show the position of the entire train on the track, both current location and geographic shape (uphill or downhill) as a vertical slice of the track profile in real-time.

5.3 Track Curvature Representation

The top graphic of the track profile section is made up of blocks that represent track curvature. A block above the dividing line represents a curve to the right, a block below the dividing line represents a curve to the left. The longer the block the longer the curve. The higher the block the more severe the curve.

5.4 Overhead View/Supplemental Information

Just above the horizontal view is the overhead view. This view incorporates symbols to represent track structures such as crossings, signals, overpasses, underpasses, and sidings.

5.5 In-Train Forces

Directly below the train represented on the LEADER display is the portion of the screen dedicated to showing in-train forces. All in-train forces are displayed as a graphic that maps to each car in the train. Follow any point on any of the force functions straight up the display and it will intersect with a point on the train where that particular level of force is currently present. Three types of forces are represented on two different graphics. The two graphics can be identified as the draft/buff magnitude force functions and the Lateral divided by Vertical (L/V) force ratio function.

The draft/buff force graphic represents draft forces as a function above the 0 kilo-pound line and buff forces as a function below the 0 kilo-pound line. Draft and buff forces can be divided into two categories, steady state and transient. Steady state forces are shown, in general, by a smooth, relatively slow changing function. Transient draft and buff forces (run-in/run-out or slack induced forces) are shown by "spikes" of force that travel through the train. LEADER accurately calculates and displays both. Slack induced forces represent momentum transfers between the cars resulting in potential lading and car damage.

The Lateral over Vertical (L/V) force ratio graphic is shown above the draft/buff force graphic. L/V forces appear in cars as they traverse curves in the track.

5.6 Brake Pipe Pressure/Brake Cylinder Pressures

Directly below the force graphics are two functions that represent brake pipe pressure throughout the train and brake cylinder pressure throughout the train. Again, these functions map to a location in the train representation directly above. Because the functions are real-time representations of the brake system, it is possible to monitor a brake application or release as it travels through the entire train.

5.7 Trajectory/Telemetry Information

The lower right and lower center sections of the screen have real time trajectory and status information displayed in both digital and analog bar graph format. The following list contains the parameters currently shown on the LEADER Display: Sections are numbered to match the identification blocks of FIG. 5.

5.7.1 Head End Information

Location is a digital representation of mile market location of the head end locomotive. Slope is the grade of the track at the location of the head end locomotive. Curvature is the degree of curvature of the track at the location of the head end locomotive.

5.7.2 Speed is shown as a digital read out followed by an analog bar graph representing the speed of the head end locomotive at each instant in time. The bar graph will turn from a normal color of green to red if the speed limit is exceeded.

5.7.3 Acceleration is shown as a digital read out followed by an analog bar graph representing the acceleration of the head end locomotive at each instant in time.

5.7.4 Current Speed Limit is shown as a digital read out of the speed limit for the current position of the head end locomotive.

5.7.5 Feed Valve Setting is the pressure at which the feed valve is set, displayed in pounds per square inch (psi).

5.7.6 Fuel is the amount of fuel consumed since the counter was last reset.

5.7.7 Consist Length is a digital read out of the length of consist shown in feet.

5.7.8 Time is the digital read out of the current time.

5.7.9 Brake Pipe Reduction (or EP Brake Command) This graphic takes on two roles; one for conventional pneumatic brake equipped trains and one for EP Brake equipped trains. In Conventional, the graphic is a digital read out followed by an analog bar graph representing the brake pipe pressure reduction at the head end locomotive at each instant in time. The LEADER system has the capability to support trains equipped with EP Brake Systems rather than conventional displacement valves. In an EP equipped train the graphic is a digital read out followed by an analog bar graph representing the percent of brake commanded to the EP System.

5.7.10 Draw Bar Forces is a digital read out followed by an analog bar graph representing the instantaneous locomotive draw bar force.

5.7.11 Fuel Consumption Rate is a digital read out followed by an analog bar graph representing the instantaneous fuel consumption rate of the entire train shown in Gallons Per Hour (GPH).

5.8.1 Excessive Speed Warning is an audio and/or visual warning that will appear on the LEADER Display when the speed of the locomotive exceeds the speed limit for the current track location. The speed restriction for the track can be modified to reflect slow orders for a section of trackage. A mark is shown on the speed indication graphic that represents the current speed limit.

5.8.2 Minimum Safe Pneumatic Brake Reduction is of interest for safe train operation. As brake applications are applied and released the charge state of the pneumatic brake system can become such that an undesired release of brakes will occur if the next brake application requested is not deep enough. LEADER will calculate the safe brake application level and visually display a target on the Brake Reduction bar graph. If the brake application requested is not deep enough, a visual warning will be posted by the LEADER display. This will be discussed with respect to FIGS. 3 and 4.

5.8.3 Gluttony is a measure of how the train is being moved with regards to fuel efficiency. Gluttony is calculated and displayed in gallons/thousand-ton-miles.

The LEADER display is equipped with eight function keys at the bottom of the display. The definition of each function key is shown in the representation of the key on the LCD panel directly above it. The function keys allow user input to the system, accessing various setup and configuration menus and querying information from the LEADER system.

LEADER is capable of three operating modes, each building on the previous mode. The three modes advance LEADER from a real time display passively providing information to the locomotive engineer (information only mode) to a LEADER system that will suggestions to the locomotive engineer on how to better handle the train (driver assist mode) and finally to a control system that is capable of issuing commands to optimally control the locomotive (cruse control mode).

In the information only mode, the locomotive engineer makes all of the decisions and solely activates the various control systems in a manual mode. The LEADER provides information to the engineer that is not currently available to him to use to manage various locomotive control systems. In driver assist mode, LEADER determines and displays the optimum locomotive power dynamic brake throttle setting and the locomotive and car brake control settings. These settings are determined for the head end locomotives and the remotely controlled locomotives. These recommendations are desired settings displayed to the locomotive engineer who can then elect to manually move the various controls to achieve these settings. In the cruise control mode, leader derived settings are used to automatically control the locomotive power and braking systems, the train brake system of each car and ancillary systems which effect train movement. The locomotive engineer services as an operational supervisor with the ability to manually override the cruise control. Cruise control can also be effectuated by communication links between the leader and the railroad central traffic control center.

LEADER would receive and activate a variety of commands received from the central traffic control center. This received information would include impeding slow orders, speed limit changes, aspects of approaching signals, etc. LEADER would provide status updates to the control center, including current train speed, current track location, detected faults or equipment malfunctions, estimated time of arrival, etc. The traffic control can use this information to manage the complete safe and effective movement of train traffic under its control.

A common phenomenon in freight car braking is called undesirable brake release. Due to the idiosyncracies in the physics of the brake car control valves and systems, certain brake applications can result in unintentional release of the brake after application has been made. Although the locomotive engineer has controls in the locomotive to set the application, the action of the brake valves may cause the brakes to release on their own. This phenomenon occurs if the locomotive engineer does not allow sufficient time for the brake pipe to recharge from a previous brake application and the inherent taper of brake pipe pressure along the train. The amount of time that must be allowed is highly depended upon the number of cars in the train, the extent of the previous application and the extent of a new application.

The brake pipe of a freight train is inherently leaky, causing a pressure gradient or taper from the Equalizing Reservoir (ER) Pressure at the head end or lead locomotive, to the rear end or End of Train (EOT) pressure (at the last car of the train). The more severe the leakage, the more severe the gradient. This gradient is known as the True Taper of the brake pipe.

As a locomotive engineer applies and releases the pneumatic brakes of the train, the brake pipe pressure across the train will acquire a gradient or taper because the compressors on the locomotive(s) have not recharged the brake pipe. This is known as a False Taper. A failure to make a deep enough reduction in the pneumatic brake of a freight train can cause an undesired release when the pneumatic brake system has had insufficient time to charge or recharge.

If the brake system is known to be charged, the Locomotive Engineer will reduce the equalizing reservoir between 7 psi and 26 psi depending on the amount of brake needed. This reduction will be made independent of EOT pressure since the state of brake system is known to be charged.

If the state of the brake pipe is in doubt, the locomotive engineer will reduce the equalizing reservoir pressure approximately seven (7) psi below the EOT pressure displayed in the cab of the locomotive. The relative nature of conventional pneumatic freight train brakes will dictate that the brakes at each car apply a brake cylinder pressure proportional to the amount of relative drop in the brake pipe.

For example, if the ER pressure is at 85 psi and the EOT pressure is 80 psi and the brake system is in steady state, there exists a 5 psi true taper due to leakage. If the engineer wishes a minimum reduction, he will make a seven (7) psi reduction of ER to 78 psi, the entire brake pipe will decrease by 7 psi and the EOT pressure will report 73 psi. The brake valves on the cars however will respond only to the 7 psi drop and a stable brake application will be applied throughout the train. This amount of brake effort will represent the command of the locomotive engineer, for a minimum reduction.

If the same example exists, but the engineer is in doubt about the state of the brake system he will make a seven (7) psi reduction below the EOT pressure at (80 psi–7 psi) 73 psi at the ER because he suspects a false brake pipe taper and wishes to avoid an undesirable release of his brake. The ER pressure is now dropped to 73 psi (EOT–7 psi), a 12 psi reduction. The brake pipe will again maintain its True Taper, and the EOT pressure will settle at 68 psi. Each individual car will respond to the relative change in pressure, a 12 psi drop. The Locomotive Engineer will now have much more brake than desired and the train will slow to quickly.

LEADER has the capability of determining the True Taper of the train when the brake system reaches steady state and displaying information to the locomotive engineer regarding the true state of the pneumatic brake system. By using this information the Locomotive Engineer can make precise decisions on brake applications to achieve the amount of brake desired without risk of an undesired release.

The LEADER system provides a minimum brake reduction to minimizes the occurrence of undesired brake release. As illustrated in the flow chart of FIG. 3, the state of the brake system is determined from the LEADER algorithms.

Figure 3:
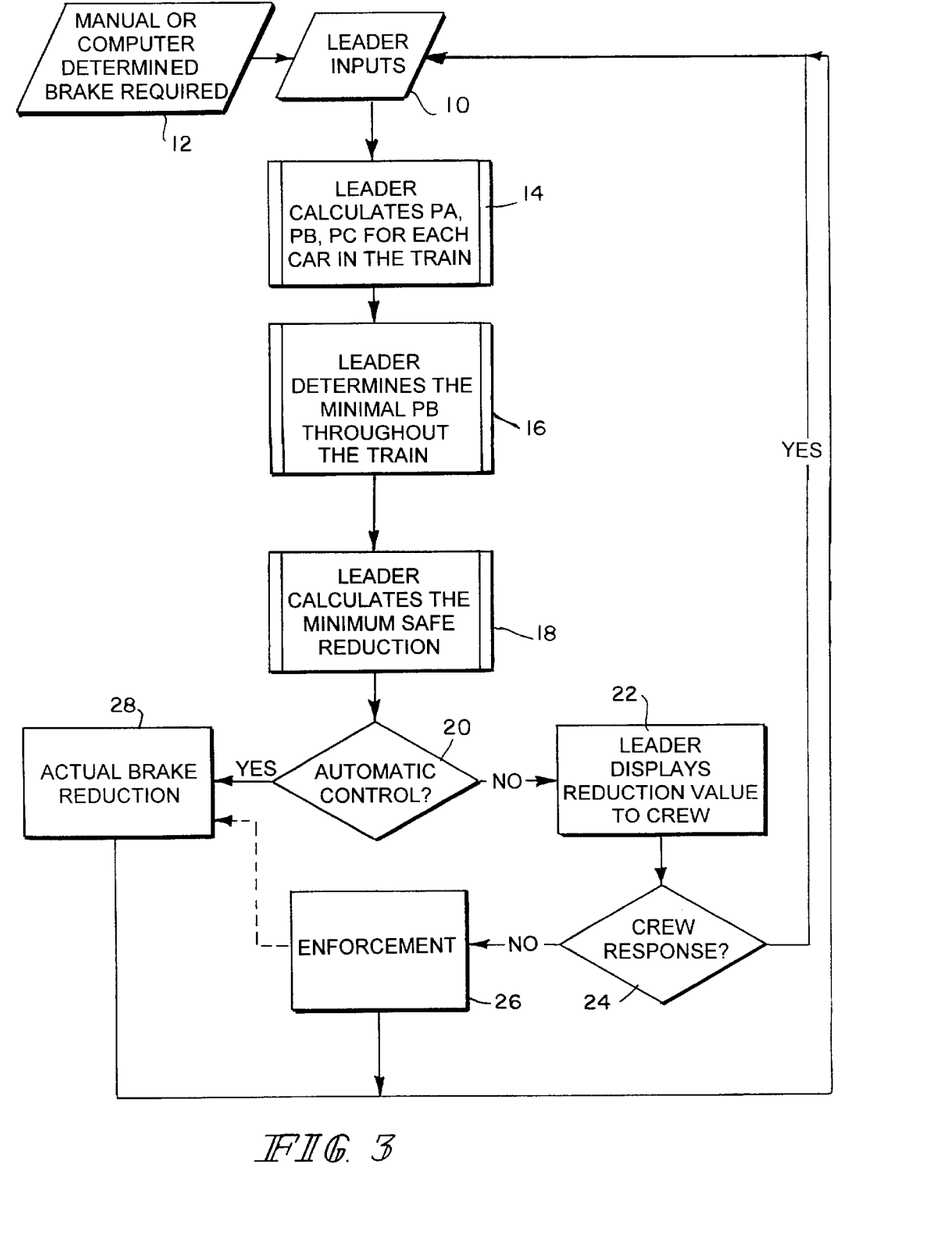
FIG. 3 is a flow chart of a first embodiment of a method for minimum safe brake reduction according to the principles of the present invention.

LEADER inputs are collected at 10. For example, it measures the locomotive brake control settings or determined brake requirement at 12, the brake pipe pressures and the time. The brake pipe pressures may be measured at each locomotive and the end-of-train device or any other sensor or smart node throughout the train. Any additional measurement is used to increase the accuracy of the math model for the pressure in the train brake system. The data base of the train make up including car weights and lengths, brake equipment definition and coupler types etc. is also used.

The minimum safe brake pipe control pressure at each car in the train is approximated at 12 as:

$$Pb=(Pa-(10-Pc)*0.6)$$

If $(Pc>10)$, $Pb=Pa$

Where:
Pb=Minimal regulated brake pipe control pressure at the car, psi
Pa=Auxiliary reservoir pressure at the car, psi
Pc=Brake cylinder pressure at the car, psi
This takes into account the taper effect at the car depending upon its location in the train.

After determining the minimum control pressure, Pb (min) from all of the cars throughout the train at 16, the minimum safe brake pipe reduction (RED) is computed at 18 as:

$$RED=Pf-Pb \text{ (min)}$$

Where:
RED=Reduction in brake pipe pressure facilitated by brake controls, psi
Pf=Regulated feed valve setting of brake controls, psi
Pb (min)=minimal control pressure throughout the train, psi This information can be provided to the LEADER display or to the processing of brake requests for the cruise control mode. A determination is made at 20 of whether the system is in cruise or automatic control or not. If not, LEADER displays the minimum reduction value at 22. A determination at 24 is made whether the brake requested by the crew is a reduction sufficient for safe operation. If it is, the LEADER monitor provides appropriate display to the operator. If not, an audio or visual indication is transmitted to the operator at 26. Another enforcements could include actuator brake reduction as shown by the dashed lines. With an automatic cruise control, the LEADER would automatically set the calculated minimum safe reduction at 28.

As an alternative, the displays could indicate a target reduction. If the crew initiated reduction is greater than the calculated minimum safe reduction, the crew initiated reduction is displayed. If the initiated reduction is less than the minimum safe reduction, the minimum safe reduction is displayed as the target.

Experimentation has determined that reducing the brake pipe pressure at least 3 PSI below the car reservoir pressure, at the time of application will yield the safe brake application that will not unintentionally release.

Figure 4:
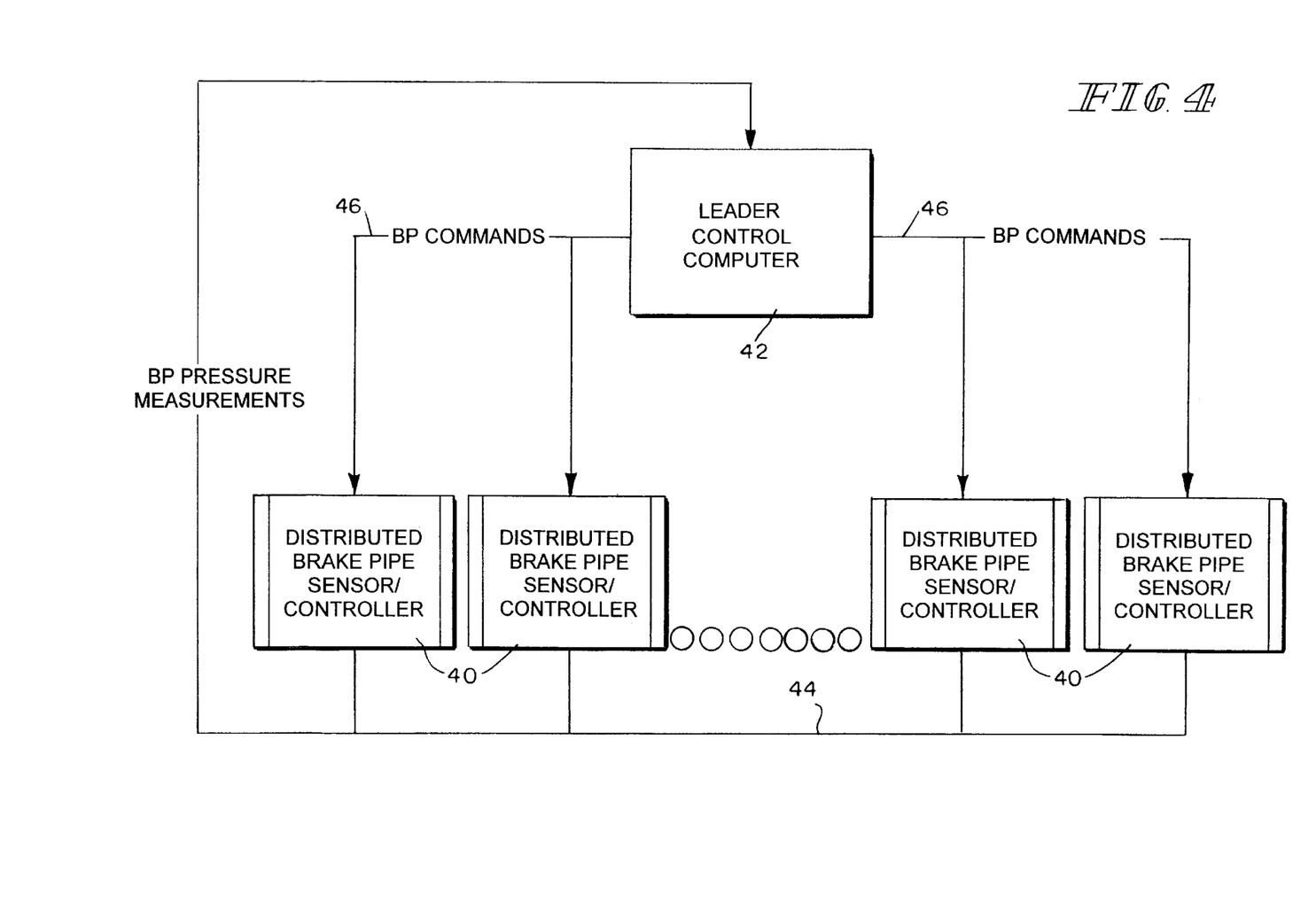
FIG. 4 is a flow chart for the control of braking system having multiple brake pipe controllers for minimal safe brake reduction according to the principles of the present invention.

FIG. 4 illustrates the brake system where control of the brakes of individual car's EP braking is available or multiple brake pipe controllers or smart vent valves are distributed throughout the train brake system. It should be noted that if the total train is an EP train, namely, where each of the cars have electropneumatic brakes, direct control of the brake reduction at each of the cars would be controlled, and therefor a safe reduction at the head end or at points distributed throughout the train would not be necessary. The present description of FIG. 4 is for trains that have cars with conventional and EP braking.

The distributed brake pipe sensor/controller 40 may be, as previously discussed EP brake, multiple brake pipe controllers or smart vent valves. The distributed brake pipe controllers 40 provide brake pipe pressure measurements to the LEADER control computer 42 as illustrated by line 44. The LEADER controlled computer 42 then determines the brake pipe status using these measured values and interpolates therebetween using the previously discussed algorithms. This increases the accuracy of measurement of the taper or other effects within the brake system throughout the train. The LEADER control computer 42 then determines a safe minimal brake reduction and provides it to each of the distributor brake pipe sensor/controller 40 as illustrated by lines 46. Lines 44 and 46 are just for illustrative purposes and as a flow chart and may represent a single communication line, whether it is hard wire or radio.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method of minimizing undesirable brake release in a brake system of a train having a pneumatic brake on each car connected to a train brake pipe which is controlled by a brake pipe controller, the method comprising:
determining status of the brake system through out the train; and
determining the minimal brake pipe reduction for the brake pipe controller, using the status of the brake system, which minimizes the potential for undesirable brake release.

2. A method according to claim 1, including displaying the determined minimal brake pipe pressure reduction.

3. A method according to claim 1, wherein determining the status includes determining brake pipe pressure at each car.

4. A method according to claim 3, wherein determining the status includes determining a minimal brake pipe pressure for each car.

5. A method according to claim 1, wherein determining the status includes determining a minimal brake pipe pressure for each car as a function of the pressure of a reservoir of each car.

6. A method according to claim 5, wherein determining the status includes determining a minimal brake pipe pressure for each car as three psi less than the pressure of a reservoir of each car.

7. A method according to claim 1, wherein determining the status includes determining a minimal brake pipe pressure for each car as a function of the pressure of a reservoir and a brake cylinder of each car.

8. A method according to claim 7, wherein determining a minimal brake pipe pressure for each car includes setting the minimal brake pipe pressure to the reservoir pressure for brake cylinder pressures greater than a first value and setting the minimal brake pipe pressure to pressures less than the reservoir pressure for brake cylinder pressures less than the first value.

9. A method according to claim 1, wherein:
determining the status includes determining the brake pipe controller setting; and determining the minimal brake pipe pressure reduction using the determined brake pipe controller setting.

10. A method according to claim 1, including:

determining a requested brake pipe pressure reduction;

comparing the requested brake pipe pressure reduction to the determined minimal brake pipe pressure reduction; and indicating if the requested brake pipe pressure reduction is less than the determined minimal brake pipe pressure reduction.

11. A method according to claim 1, including:

determining a requested brake pipe pressure reduction;

comparing the requested brake pipe pressure reduction to the determined minimal brake pipe pressure reduction; and displaying the determined minimal brake pipe pressure reduction if the requested brake pipe pressure reduction is less than the determined minimal brake pipe pressure reduction and displaying the requested brake pipe reduction if the requested brake pipe pressure reduction is greater than the determined minimal brake pipe pressure reduction.

12. A method according to claim 11, including controlling the brake pipe controller to the displayed brake pipe pressure reduction.

13. A method according to claim 1, including:

determining a requested brake pipe pressure reduction;

comparing the requested brake pipe pressure reduction to the determined minimal brake pipe pressure reduction; and controlling the brake pipe controller to the determined minimal brake pipe pressure reduction if the requested brake pipe pressure reduction is less than the determined minimal brake pipe pressure reduction and controlling the brake pipe controller to the requested brake pipe pressure reduction if the requested brake pressure pipe reduction is greater than the determined minimal brake pipe pressure reduction.

14. A method according to claim 1, wherein the brake pipe controller is in a locomotive of the train.

15. A method according to claim 1, wherein:

the train includes a plurality of brake pipe controllers;

determining status of the pneumatic brake system at each brake pipe controller; and determining the minimal brake pipe pressure reduction for each brake pipe controller.

16. A method according to claim 15, wherein determining the status of the brake system between each of the brake pipe controllers includes using train brake system modeling.

17. A method according to claim 1, wherein determining the minimal brake pipe pressure reduction includes using train brake system modeling.

18. A method of minimizing undesirable brake release in a brake system of a train having a pneumatic brake on each car connected to a train brake pipe which is controlled by a brake pipe controller, the method comprising:

determining a minimal brake pipe pressure for each car in the train which minimizes the potential for undesirable brake release; and determining the minimal brake pipe reduction for the brake pipe controller, using the lowest minimal brake pipe pressure determined.

19. A method according to claim 18, wherein the minimal brake pipe pressure is determined for each car as a function of the pressure of a reservoir of each car.

20. A method according to claim 18, wherein the minimal brake pipe pressure for each car is determined as three psi less than the pressure of a reservoir of each car.

21. A method according to claim 18, wherein the minimal brake pipe pressure for each car is determined as a function of the pressures of a reservoir and brake cylinder of each car.

22. A method according to claim 21, wherein a minimal brake pipe pressure for each car includes setting the minimal brake pipe pressure to the reservoir pressure for brake cylinder pressures greater than a first value and setting the minimal brake pipe pressure to pressures less than the reservoir pressure for brake cylinder pressures less than the first value.

23. A method of minimizing undesirable brake release in a brake system of a train having a pneumatic brake on each car connected to a train brake pipe which is controlled by a brake pipe controller, the method comprising:

determining a minimal brake pipe reduction for the brake pipe controller which minimizes the potential for undesirable brake release;

displaying the minimal brake pipe reduction; and comparing a requested brake pipe reduction to the minimal brake pipe reduction.

24. A method according to claim 23, including indicating when the requested brake pipe reduction is less than the minimal brake pipe reduction.

25. A method of minimizing undesirable brake release in a brake system of a train having a pneumatic brake on each car connected to a train brake pipe which is controlled by a brake pipe controller, the method comprising:

determining a minimal brake pipe reduction for the brake pipe controller which minimizes the potential for undesirable brake release;

comparing a requested brake pipe reduction to the minimal brake pipe reduction; and indicating when the requested brake pipe reduction is less than the minimal brake pipe reduction.

26. A method according to claim 25, including controlling the brake pipe controller to the determined minimal brake pipe reduction if the requested brake pipe reduction is less than the determined minimal brake pipe reduction and controlling the brake pipe controller to the requested brake pipe reduction if the requested brake pipe reduction is greater than the determined minimal brake pipe reduction.

27. A method of minimizing undesirable brake release in a brake system of a train having a pneumatic brake on each car connected to a train brake pipe which is controlled by a brake pipe controller, the method comprising:

determining a minimal brake pipe reduction for the brake pipe controller which minimizes the potential for undesirable brake release;

comparing a requested brake pipe reduction to the minimal brake pipe reduction; and controlling the brake pipe controller to the determined minimal brake pipe reduction if the requested brake pipe reduction is less than the determined minimal brake pipe reduction and controlling the brake pipe controller to the requested brake pipe reduction if the requested brake pipe reduction is greater than the determined minimal brake pipe reduction.

28. A locomotive display system for a train including a brake system having a pneumatic brake on each car connected to a train brake pipe which is controlled by a brake pipe controller, the display system comprising:

a display of brake pipe reduction at the locomotive; and a display of a minimum brake pipe reduction which minimizes undesirable release in the brake system.

29. A system according to claim 28, wherein the brake pipe reduction is an analog display and the minimum brake pipe reduction is an indicia on the analog display.

30. A system according to claim 29, wherein the brake pipe reduction is also digitally displayed.

31. A system according to claim 28, including means for determining the minimal brake pipe reduction as a function of the brake system status.

32. A system according to claim 31, wherein the means determines a minimal brake pipe pressure which minimizes the potential for undesirable brake release for each car in the train; and determines the minimal brake pipe reduction for the brake pipe controller using the lowest minimal brake pipe pressure determined.

* * * * *